United States Patent

[11] 3,567,042

| | | | | | | |
|---|---|---|---|---|---|---|
| [72] | Inventor | Norman J. Borgo<br>Pittsburgh, Pa. | | 2,717,669 | 9/1955 | Stock ............................ 213/43UX |
| [21] | Appl. No. | 786,259 | | 3,252,587 | 5/1966 | Scales.............................. 213/43 |
| [22] | Filed | Dec. 23, 1968 | | | | FOREIGN PATENTS |
| [45] | Patented | Mar. 2, 1971 | | 1,037,083 | 7/1966 | Great Britain................ 213/43 |
| [73] | Assignee | Pittsburgh Forgings Company<br>Caraopolis, Pa. | | | | |

*Primary Examiner*—Drayton E. Hoffman
*Attorney*—Webb, Burden, Robinson & Webb

[54] PNEUMATIC-HYDRAULIC SHOCK ABSORBER
1 Claim, 3 Drawing Figs.

[52] U.S. Cl............................................... 213/43,
188/88, 267/64, 267/115
[51] Int. Cl....................................... B61g 9/08,
B61g 9/16
[50] Field of Search......................... 213/8.43;
188/88.51 (Digest); 267/64, 65, 115

[56] References Cited
UNITED STATES PATENTS
1,855,064  4/1932  Messier ....................... 213/43UX ABSTRACT: A pneumatic-hydraulic shock absorber having a high-pressure chamber formed by a cylinder and containing a liquid and a low-pressure chamber formed in the hollow portion of a piston and containing a liquid and a compressed gas. The shock is absorbed by the throttling action of a metering pin positioned in a deflector tube which connects the two chambers. The entrapped gas and foam which is drawn into and settles out in the high-pressure chamber is returned to the low-pressure chamber by an interconnected set of passageways therebetween.

PATENTED MAR 2 1971

INVENTOR.
*Norman J. Borgo*
BY *Webb Burden*
*Robinson & Webb*

HIS ATTORNEYS

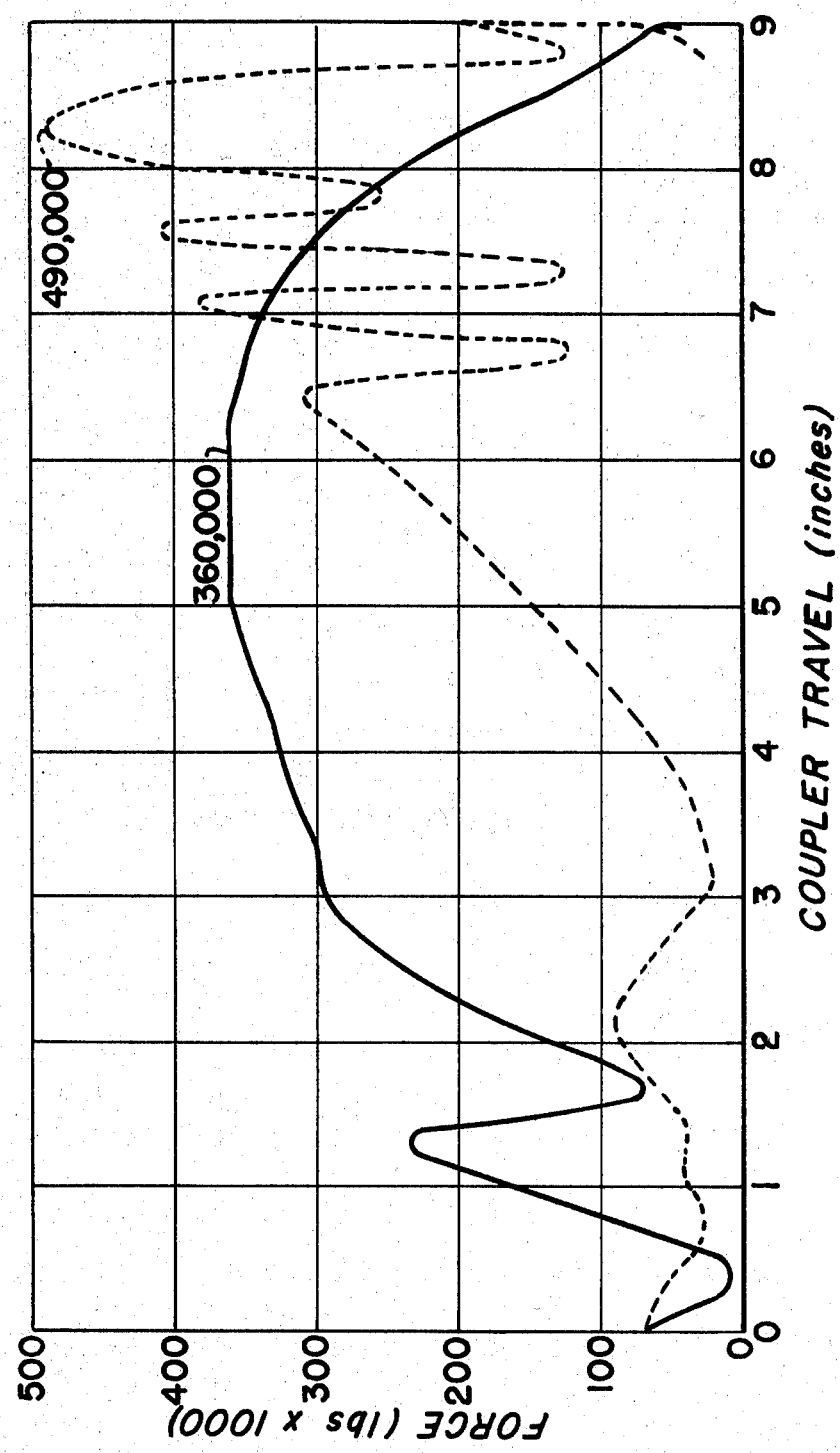

PNEUMATIC-HYDRAULIC SHOCK ABSORBER

This invention relates to a pneumatic-hydraulic shock absorber and more particularly to an improved shock absorber for use in the horizontal position with a railway car coupler.

A shock absorber when used in conjunction with a coupler for joining railway cars must be able to withstand severe impact in both the draw and buff position. Because of these severe impacts, simplicity of construction, ease of maintenance, and reasonable cost are necessary prerequisites. One such pneumatic-hydraulic shock absorber is taught by Scales, U.S. Pat. No. 3,252,587, issued May 24, 1966. My invention is an improvement on the type of pneumatic-hydraulic shock absorber taught by the Scales patent.

The major drawback to a shock absorber of the type taught in the Scales patent having a high-pressure liquid chamber and a connecting compressed gas-liquid chamber is the entrapment of the gas within the liquid phase which has the ultimate effect of returning to the high-pressure chamber and settling out as gas and foam. This gas and foam in the high-pressure chamber has a greater compressibility than the liquid and the initial impact compresses this fluid and foam, thus delaying the desired cushioning effects. This problem can be solved by a bladder or a floating piston to keep the gas and liquid from mixing, but both of these solutions add additional expense as well as diminish the overall reliability of the shock absorbers.

My invention solves the problem by removing the gas and foam from the high-pressure chamber and returning it to the gas-liquid chamber. My invention further accomplishes this with sufficient rapidity so that improved resistance is given to all impacts and these impacts are proportionally absorbed throughout the period of time when the large forces are applied.

My invention provides a passageway to remove the gas from the liquid chamber and return it to the gas-liquid chamber. The passageway is of a size which will accommodate such gas but will not let enough liquid pass to effect the energy absorption of the shock absorber.

In the accompanying drawings, I have shown one preferred embodiment of my invention in which:

FIG. 3 is a force-time curve showing the improvement of my invention compared to the known shock absorber.

Figure 1:
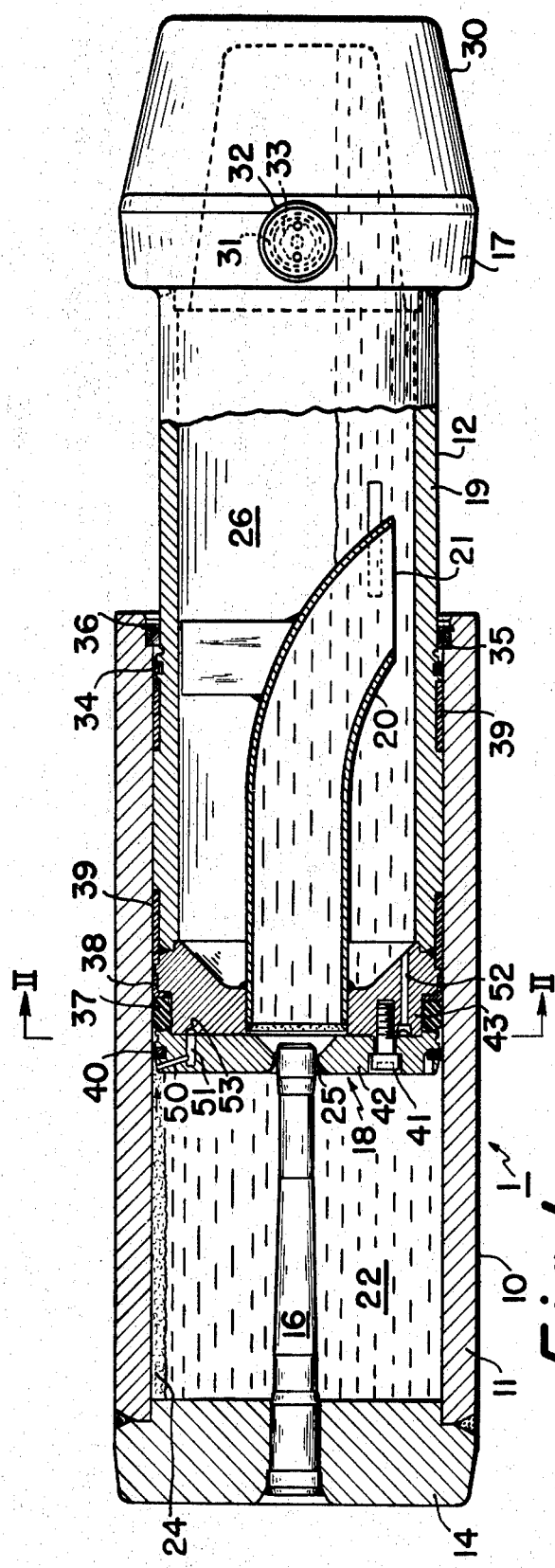
FIG. 1 is a front view partly in section of the shock absorber in its horizontal position.

The shock absorber 1 is firmly mounted on the frame of a railway car (not shown). The shock absorber is positioned horizontally for operation with a conventional railway car coupler (not shown). The shock absorber includes a cylinder 10 and a hollow piston 12 hereinafter called a plunger, see FIG. 1. The cylinder 10 has a head plate 14 and tubular wall 11. The plunger 12 also has a head plate 17, an end wall 18 and tubular sidewalls 19. The head plate 17, end wall 18 and sidewall 19 form a hollow chamber 26 which is the gas-liquid or low-pressure chamber. The head plate 14 of cylinder 10, tubular wall 11 and end wall 18 of the plunger form the liquid or high-pressure chamber 22. Plunger 12 is slidably mounted in cylinder 10 and the plunger and cylinder are both movable relative to each other. The plunger-cylinder in the open position are limited by stops (not shown) depending from the frame and positioned at either end of the shock absorber. Therefore, a buff or impact against striker 30 forces the plunger 12 into the cylinder 10 which is held in place by its respective stops. On the other hand, a draw on the coupler engages a yoke (not shown) which pulls the cylinder 10 over the plunger 12 which is held in place by its respective stops. Therefore, regardless of whether there is a draw or a buff, one of either the plunger or cylinder moves relative to the other.

A passageway 25 extends through the plunger end wall 18 into the high-pressure chamber 22. A metering pin 16 attached to the cylinder head plate 14 extends through passageway 25. Metering pins are well known in the art and act to throttle the passage of liquid between chambers and thus build up force to repel the force causing the relative movement of the plunger and cylinder. This relative moving force is then dissipated by the liquid throttling action. A deflector tube 20 extends from the plunger end wall 18 and passageway 25 into chamber 26. This deflector tube 20 is the passageway for passage of liquid between chambers 22 and 26. The metering pin 16 operates within passageway 25 and deflector tube 20 to throttle the liquid movement as stated heretofore.

The liquid such as oil is introduced through the inflation valve 33 which has an O-ring 31 and an inspection plug 32. The liquid fills up all of high-pressure chamber 22 and a portion of chamber 26. Enough liquid is employed so that the deflector tube mouth 21 which depends downwardly is always immersed. Typical of the oils employed is Type A automatic transmission oil. A compressed gas such as compressed nitrogen is also introduced through inflation valve 33 and fills the area above the oil level in chamber 26. The necessary seals, wipers and rings are employed to insure proper sealing of the plunger 12 and cylinder 10. Inner and outer wipers 34 and 35, respectively, retaining ring 36, main seal 37, backup ring 38 and piston ring 40 are provided for that purpose. Nylon bearings 39 between the plunger and cylinder are provided to minimize frictional interference during the movements of the plunger and cylinder.

In theory, the afore-explained shock absorber should be sufficient to accomplish adequate impact cushioning. However, it has been found that some of the gas is carried into the high-pressure chamber 22 through the deflector tube mouth 21 and deflector tube 20. This occurs because an impact causes high oil turbulence in plunger chamber 26. This turbulence entrains considerable gas in the oil. The same impact, of course, forces the plunger 12 into the high-pressure chamber 22 forcing the liquid through orifice 25 into chamber 26. The liquid is throttled by metering pin 16 as it is forced into chamber 26 and thus the impact is absorbed. The liquid of the high-pressure chamber 22 is far less compressible than the liquid-gas system in the plunger chamber 26. Therefore, the return stroke to the normal position is rapid and occurs almost immediately after impact. There is insufficient time for the entrained gas to settle out in the low-pressure chamber 26 and, therefore, it is carried into chamber 22 on the rebound stroke. Once in the high-pressure chamber 22, it does settle out to form a gas and foam system at the topmost portion 24 of chamber 22.

Figure 2:
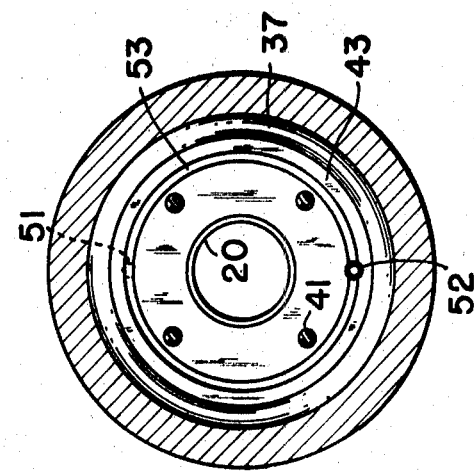
FIG. 2 is a section taken along section lines II-II of FIG. 1.

If this gas and foam were allowed to remain in chamber 22, the force causing the initial portion of the stroke from the next impact would not meet adequate immediate resistance afforded by controlled flow of the relatively incompressible liquid through an orifice, and would merely initially compress the entrapped foam and gas. The remainder of the stroke would have to absorb a disproportionate share of the impact energy, resulting in high pressures and excessive deceleration forces or shock. My invention solves this problem by providing a connected network of passageways for returning the gas and foam to chamber 26. Vent 50 connects at the uppermost corner of chamber 22 immediately adjacent piston ring 40. Vent 50 extends into passageway 51 which extends through piston end wall 18 and into transfer groove 53, see FIG. 2. Piston end wall 18 is actually made in two sections, 42 and 43, which are joined to form end wall 18 by socket screws 41. Transfer groove 53 is recessed into wall 43. However, the transfer groove may be recessed in either wall or could be recessed in both walls so when they are joined a continuous annular groove extends around and within end wall 18 at the interface of sections 42 and 43. Transfer groove 53 exits at exhaust port 52 which leads into the bottom portion of chamber 26. Port 52 exhausts near the bottom of the oil reservoir but at a point remote from the deflector tube mouth 21.

The size of the network of passageways is important since the diameter must be large enough to allow prompt escape of the gas yet small enough that the more viscous oil will not flow in quantities sufficient to affect the energy absorption of the complete shock absorber. The size of the initial exit vent 50 is critical in this respect. It has been found for Type A automatic transmission fluid that if the ratio of the cross section of vent 50 to the cross section of orifice 25 less the cross section of metering pin 16 at the orifice when the shock absorber is in an open position is about 1:25, my improved shock absorber will work effectively. It has also been found that even a relatively large bleed hole (vent 50) can be compensated for by reducing the size of the main orifice (passageway 25). Therefore, the aforementioned ratio of 1:25 is not in any way limiting and is merely one of many combinations which will adequately bleed the entrapped gas and foam from the high-pressure chamber into the low-pressure chamber without materially affecting the energy absorption properties of the shock absorber.

The operation of the shock absorber itself has been described heretofore. The buildup of settled out gas and foam is removed through the passageways by normal train movement which actually pumps out the gas and foam. Therefore after any impact, normal train movement, or any movement at all for that matter, purges out the gas from the high-pressure chamber, thus maintaining a complete liquid phase in that chamber preparatory to receiving another impact.

The network of passageways has greatly improved the overall performance of the shock absorber by permitting instantaneous response to impact and thereby absorbing the impact in equal proportion throughout the relative stroke of the plunger and cylinder. This improvement can readily be seen in FIG. 3 which shows a force-time curve for the shock absorber before and after my improvement had been installed.

The conditions from which the test results were derived are substantially identical for both shock absorbers. The abscissa of the curve represents the distance traveled by the coupler which is the same as the distance traveled by the plunger in the cylinder. The ordinate of the curve represents the measured force on the shock absorber at the given increment of travel of the coupler or plunger in the cylinder.

The dotted line represents the force-travel curve for a conventional shock absorber of the type taught by the Scales patent which was mounted in conjunction with the coupler of an actual railway car. The shock absorber contained entrapped gas in the high-pressure chamber from a previous impact. Impact was created by joining a railway car traveling at 6.60 miles per hour at time of impact to the stationary railway car mounted with the shock absorber. The curve clearly shows that the impact initially drove the plunger into the chamber with very little resistance with the result that ultimately a very high force, 490,000 pounds, had to be dissipated after the plunger had traveled 8 inches out of a total possible travel of 9 inches.

The solid line represents my improved shock absorber which had bled out the entrapped gas from a previous impact. The impact on my improved shock absorber was created by joining railway cars similar to the aforementioned car, one of which was stationary and the other of which was traveling at 6.68 miles per hour at impact. The solid curve shows the drastic improvement. The impact is immediately resisted and, therefore, the maximum force buildup is only 360,000 pounds, 36 percent less force buildup than the other shock absorber. In addition, my improved shock absorber shows a proportional distribution of force over the entire travel of the plunger whereas the shock absorber without my improvement shows a very disproportionate buildup of force with the majority of resistance having to come very late in the travel of the plunger.

I claim:

1. In a shock absorber having a first chamber formed by a hollow cylinder and containing a liquid and a second chamber formed by a hollow piston having an end wall with an orifice and being slidably mounted for horizontal movement in the cylinder, and said second chamber containing a liquid and a compressed gas, the two chambers being connected by a deflector tube axially mounted to said orifice, said deflector tube extending into the piston chamber and exiting into the liquid, a metering pin mounted to the cylinder chamber and adapted to operate within the deflector tube for controlling the passage of the liquid between the chambers, the improvement comprising in combination therewith the end wall of the piston comprising a first and a second section having adjoining unexposed surfaces, said first section forming a part of the first chamber and said section forming a part of the second chamber, at least one of said sections having an annular recess in the unexposed surface, said annular recess connected to substantially the top of the first chamber by a passageway through said first section and connected to substantially the bottom of said second chamber by a passageway through said second section, said sections joined to form the end wall having an interconnected passageway therethrough.